Dec. 29, 1953         A. V. BEDFORD ET AL         2,664,462
            MULTIPLEXED SIGNAL TRANSMISSION
Filed Aug. 31, 1949                        7 Sheets-Sheet 1

INVENTORS
ALDA V. BEDFORD
& GEORGE C. SZIKLAI
BY
ATTORNEY

INVENTORS
ALDA V. BEDFORD
& GEORGE C. SZIKLAI
ATTORNEY

Dec. 29, 1953  A. V. BEDFORD ET AL  2,664,462
MULTIPLEXED SIGNAL TRANSMISSION
Filed Aug. 31, 1949  7 Sheets-Sheet 5

INVENTORS
ALDA V. BEDFORD
& GEORGE C. SZIKLAI
BY
ATTORNEY

Dec. 29, 1953    A. V. BEDFORD ET AL    2,664,462
MULTIPLEXED SIGNAL TRANSMISSION
Filed Aug. 31, 1949    7 Sheets-Sheet 7

INVENTORS
ALDA V. BEDFORD
& GEORGE C. SZIKLAI
ATTORNEY

Patented Dec. 29, 1953

2,664,462

UNITED STATES PATENT OFFICE 2,664,462

MULTIPLEXED SIGNAL TRANSMISSION

Alda V. Bedford and George C. Sziklai, Princeton, N. J., assignors to Radio Corporation of America, a corporation of Delaware Application August 31, 1949, Serial No. 113,256

25 Claims. (Cl. 178—5.2)

This invention relates to a means and method for transmission and reception, or either, of a plurality of signals at reduced bandwidth and, in particular, it is concerned with the problem of color television.

In order that color television may become a practical reality, certain basic requirements should preferably be met. In the first place, the type of transmission used should not render the present black and white television receivers useless. In the second place, such transmission should be accomplished with a minimum amount of bandwidth in the frequency spectrum compatible with acceptable resolution. This invention meets both of these requirements.

In most color television transmission systems three partial images are sent, one corresponding to the amount of green that is in the picture, another corresponding to the amount of red, and a third corresponding to the amount of blue. If all of these colors are transmitted with the definition that is equal to that provided by the present standards used in monochromatic television, the bandwidth required would be approximately three times that required for sending black and white images because, in effect, three times as much information must be transmitted. Monochromatic television is generally rendered in black and white and will be referred to hereinafter as "black and white" television for the sake of convenience. The human eye does not have as good acuity for detail in blue as it does in green, in red or in white. Also, the eye has less acuity for detail residing in variations in color (as between red and green) that it has for detail residing in variation in brightness. By taking advantage of these weaknesses of the eye, reduction in bandwidth may be obtained so that some systems heretofore proposed, occupy as little as two times the video bandwidth required for televising black and white images of equal detail. However, in accordance with novel methods and means for signal derivation and transmission, that are the subject of this invention, colored television signals of high quality can be sent within substantially the same bandwidth that is now required for black and white.

Furthermore, because signals transmitted by following the teachings of this invention are similar, in certain respects, to those required by standards presently in force, receivers constructed in accordance with these present standards will reproduce black and white images when receiving signals from a transmitter constructed and operating in accordance with this invention. Television receivers embodying this invention will operate to produce black and white or colored images from a transmitter constructed and operating in accordance with this invention, or these receivers will operate with full effectiveness to produce black and white images from standard transmitters now in use. Thus, the invention provides a system whereby the present black and white transmission and a practical bandwidth saving system of color transmission can be completely integrated. This result is advantageous, both to the broadcaster and the public, generally, and more particularly, the television viewing public.

Those skilled in the art of luminous image reproduction to which this invention is more or less directly related are familiar with the effects of the technique of gradually increasing or diminishing the amount of light in a theater or auditorium. However, it would be impossible for one present in a theater or auditorium to tell by observation whether this change in illumination is accomplished by a series of small changes from one discrete level to another or whether it is accomplished by gradual change because the intensity of light has to be increased by a very substantial amount before any change is noted by the eye.

An increase in the amount of light, less than this very substantial amount, may be provided as an abrupt and, therefore, discrete change in the illumination level without being perceived as an abrupt change by the eye of an observer.

Present-day black and white television systems are analogous to the gradual change in illumination because any intensity of light ranging from the brightest white to black could be, and usually is, transmitted for each picture element, and, accordingly, more information apparently is being sent than can be observed.

In accordance with this invention, this apparently excessive information is eliminated and additional information is substituted for it in accordance with this invention with substantially no increase in the bandwidth. As this invention is applied to color television, this means that green, for example, can be sent at discrete amplitude levels and the red or blue content of the image can be reduced so as to fit into the region between two adjacent levels.

At a receiver having instrumentalities for carrying out the invention in its signal receiving and signal utilizing aspects, it is only necessary to divide the received signal into the same proportionate levels, separate the information lying between one level and the next, and amplify such information by the same amount that it was reduced at the transmitter in order that it may regain its original magnitude.

If such a stepped or "quantized" wave, as it will be referred to hereinafter, for the sake of convenience of description, were transmitted with a bandwidth approximately the same as that now used for black and white transmission, and by methods and apparatus known prior to the invention, its shape would be so greatly distorted that the additional information that is inserted between quantized steps would be wiped out. In accordance with this invention, the quantized signal and the information that is added between those levels is sampled or keyed at time intervals occurring at a substantially uniform frequency, and the resulting signal, consisting of the series of samples, is transmitted by a system having bandwidth restriction such that the highest frequency passed thereby is approximately equal to one-half the sampling or keying frequency. If this bandwidth restriction is properly chosen, the shape of the pulses produced will not be preserved, but by a similar synchronous sampling process at the receiver, the original pulses can be reconstructed with great accuracy.

Accordingly, the principal object of this invention is to provide a novel color television system that may be completely integrated with the present black and white television system, thereby avoiding obsolescence of television equipment now in use.

Another object of the invention is to provide an improved color television system which occupies the same frequency channel bandwidth as black and white television.

A further object of the invention is to provide a color television transmission system that may be received to provide color images by special receivers and to provide images in black and white by receivers constructed to operate on signals derived and transmitted according to presently known and used standards.

These and other objects will become apparent in the detailed consideration of the accompanying drawing in which.

A complete discussion of a color television system embodying the principles of this invention will now be made. The invention is not restricted to color television, but may be employed for transmitting a plurality of sets of unrelated intelligence at reduced bandwidth. Furthermore, although it is discussed, by way of example, in relation to a transmission system employing radiated energy, it may be equally well applied to systems employing any type of transmission of the intelligence involved.

Operations involved in carrying out the invention will first be described, somewhat briefly, following which the apparatus for carrying out these operations and a detailed description of the functioning of the apparatus will be given.

Figure 1:
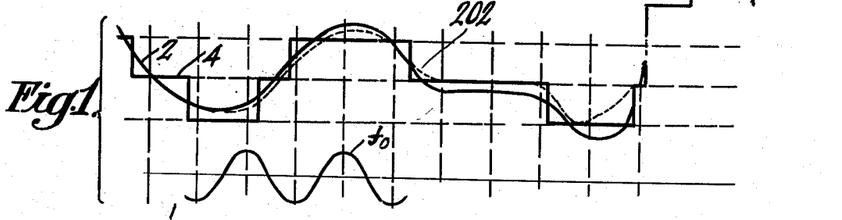
Figure 1 includes a showing of a video wave corresponding, for example, to the green content of an image such, for example, as a view or picture being or to be scanned for the purpose of deriving image signals, the sync pulse being shown on a different time scale.

Figure 1 shows a video wave 2 that is derived at the transmitter corresponding to the green content in part of one scanned line of the image, a blanking and sync pulse being shown at the right hand end. The blanking and sync pulses are not drawn to scale for purposes of convenience. The stepped waveform 4 illustrates the type of voltage waveform produced if the continuously varying video waveform 2 is quantized into levels indicated by the horizontal lines. It will be noted that the quantized wave 4 changes from one level to a new one only when the continuous video wave 2 passes closer to the new level than to the former one. The information between the curves 2 and 4 is discarded, but if the incremental differences in levels are made small enough, so that a change in intensity from one to the other is not recognized by the eye, then discarding this information does not produce any wholly obvious or apparent distortion.

Figure 2:
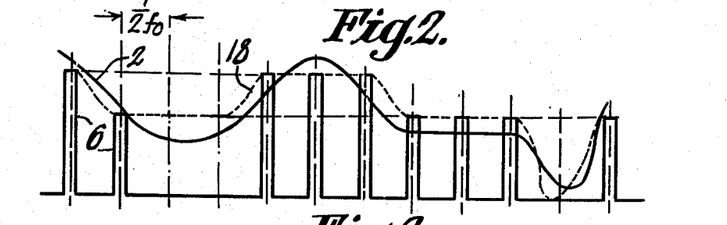
Figure 2 includes a showing of the video wave obtained by sampling the quantized information.
Figure 2A:
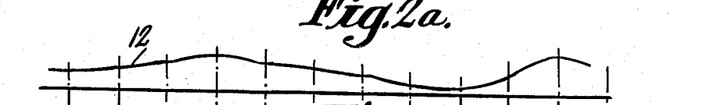
Figure 2A includes a showing of the reduced video wave corresponding to the red in the scanned image.
Figure 2B:
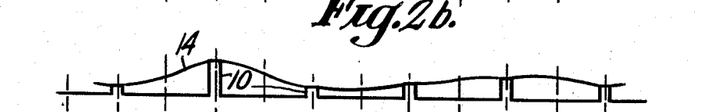
Figure 2B includes a showing of the reduced video wave corresponding to the blue in the scanned image.
Figure 3:
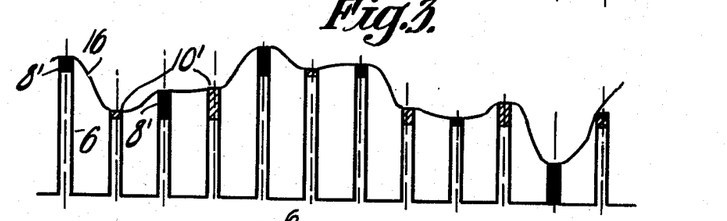
Figure 3 shows a superimposed wave formed by adding quantized samples of green and samples of red and blue.

Figures 2A and 2B represent video waves also derived at the transmitter and corresponding to the red and blue content of the same line or portions thereof as that shown in Figure 1. The vertical lines in the drawing are uniformly spaced at $\frac{1}{2}f_0$ intervals and indicate the frequency at which samples or pulses of video information are derived where $f_0$ is approximately the highest video frequency passed by the transmission system. The pulses 6 (Figure 2) indicate the information that is extracted from the quantized green video wave 4, and the pulses 8 and 10 represent reduced pulses derived from the video waves 12 and 14 corresponding to the partial images of red and blue, respectively. As shown, the pulses 8 and 10 occur at alternate intervals, but it will be readily appreciated that the order and relative numbers of these red or blue pulses can be changed, without interfering with the operation of the system as the only effect of such change is to alter the relative bandwidth and detail in the transmission of the red and blue image components. The pulses 8 and 10 have reduced amplitude so that they do not exceed one quanta or the difference between two adjacent quantized levels, and are added or superimposed on whichever of the green pulses 6 occurs at the same time. The attenuated red pulses are indicated in Figure 3 in solid black and by the numeral 8', and the reduced or attenuated blue pulses are indicated by crosshatched areas and the numeral 10'. The smooth superimposed wave 16 formed by the accumulated pulses shown in Figure 3 then represents the type of video frequency wave that is applied to the modulator of the video carrier, after certain frequency limitations. As explained above, if the overall passband characteristic of the system between the modulator and the point of separation of the signals in the receiver is chosen in accordance with the principles given herein, the detected signal will be proportional to a certain smooth wave passing through the peaks of the pulses, as indicated by the curve 16 and cross-talk between the information conveyed by the separate pulses is avoided.

At the receiver the modulation is detected to recover the video wave illustrated by curve 16 in Figure 3. This wave, obtained or derived as a received wave, is sampled at the same times at which the original pulses 6 occurred, with suitable allowance for the delay of transmission of the radio signal. This provides a set of pulses at the receiver having amplitudes proportional to the combined heights of the pulses of Figure 3. These pulses are then quantized at levels corresponding to the quantizing levels used at the transmitter, and the alternating pulses 8' and 10' as formed at the receiver and the quantized pulses 6 are separated by subtracting or comparing the pulses 6 produced by quantizing with the received modulation and supplied to two separate circuits. The separated quantized pulses 6 are then smoothed by a low-pass filter so as to reproduce wave 18 (Figure 2) which is used to modulate the green kinescope or other green image component reproducer. The red and the blue pulses are then separated from one another by a multiplexer which, successively or alternately, as shown illustratively, connects the input circuit to each of two separate output circuits in synchronism with the occurrence of the original pulses 8 and 10 at the transmitter. After suitable smoothing in low-pass filters these separated signals are then applied to means for reproducing the red and blue components of the image.

Figures 5, 5A, 5B, 5C:
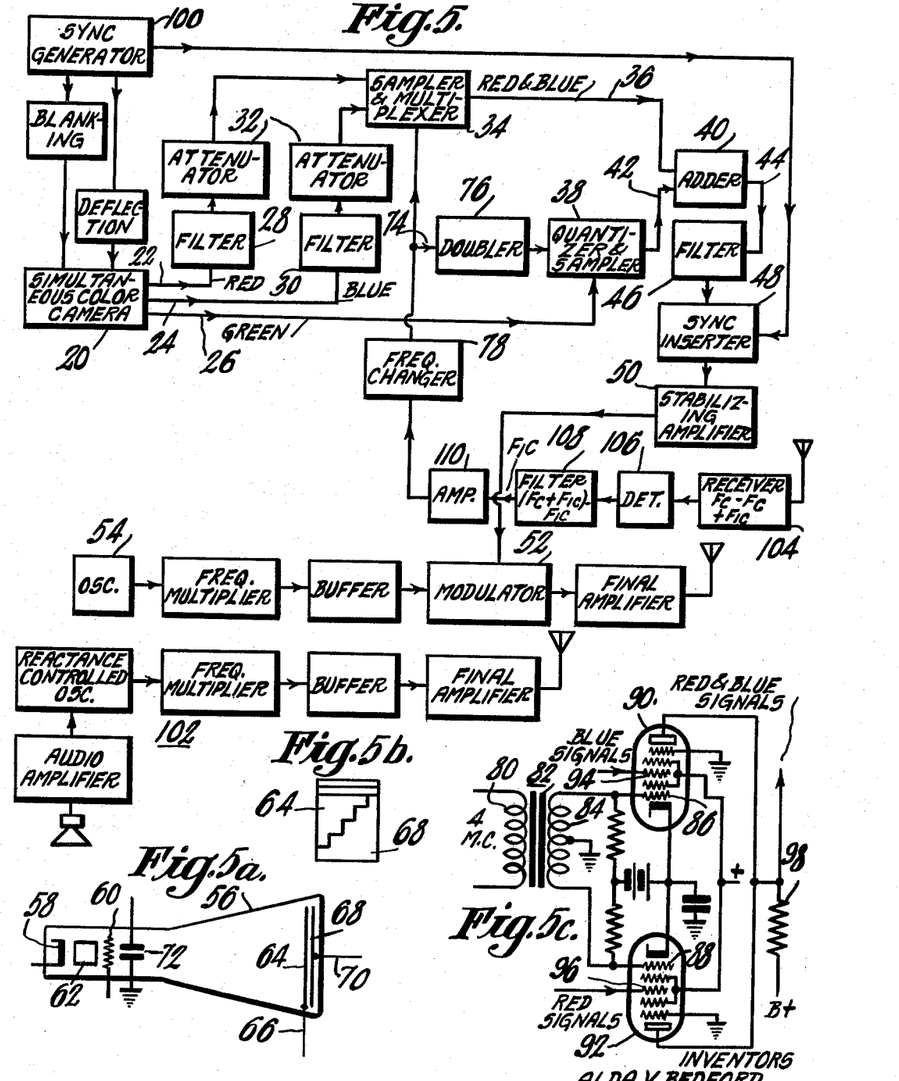
Figure 5 shows, schematically, a transmitter constructed in accordance with the concept of this invention.
Figure 5A shows, schematically, one type of sampler and quantizer.
Figure 5B shows the targets of the device shown in Figure 5A.
Figure 5C shows in schematic form a sampler and multiplexer which may be used in the transmitter of Figure 5.

A transmission system for performing these operations is illustrated schematically in Figure 5 in which a simultaneous color camera 20, which may include three separate optical paths, one for each of the color components, provides video signals corresponding to the partial images of red, blue and green on separate outputs 22, 24 and 26, respectively to the input terminals of the transmitter. In order that the red and blue signals contain only information that can be transmitted, their bandwidth is restricted by band pass filters 28 and 30. In the case where red and blue are alternated, these filters have one-half the bandwidth of the green filter, i. e., $\frac{1}{2}f_0$. The red and blue signals are passed through means 32 for reducing their amplitude to less than a quanta which may comprise a simple attenuator. The outputs of the means 32 are separately fed to a sampler and multiplexer 34 which operates to apply alternate red and blue signals to a single output lead 36. The details of the device 34 will be explained hereinafter in connection with Figure 5C. The green signals on line 26 are applied to a sampler and quantizer 38 which provides a series of pulses illustrated by waveform 6 of Figure 2 to an adder 40 via lead 42. After the red or blue pulses received on line 36 have been superimposed onto the green pulses received over line 42, the superimposed wave of pulses shown in Figure 3 is available at an output transmitter to which the lead 44 is connected. Therefore the lead 44 is connected by a filter 46, sync inserter 48, and a stabilizing amplifier 50 to a modulator 52 which is supplied with radio frequency voltages by an oscillator 54 in a conventional manner.

Figure 5A and Figure 5B illustrate a device for quantizing and sampling the green signal. Whereas this may be accomplished by use of circuits involving limiters or multivibrators, the operations are more simply and less expensively performed by a special cathode ray tube. This tube comprises an evacuated envelope 56 having placed therein a cathode 58, a control grid 60, and a means 62 for forming a flat horizontal ribbon beam of electrons. A tube for providing such a beam is disclosed in U. S. Patent No. 2,434,713 granted to Mueller on January 20, 1948. In addition, a stepped target 64, shaped as shown in Figure 5B, is mounted at the large end of the envelope and is connected by a wire 66 to the lead 42, and a collector plate 68 is provided for gathering the electrons that do not impinge upon the target 64 and for conducting them to a point of fixed potential by conductor 70. Therefore, if the video voltage wave is applied to vertical deflection plate 72, a quantized voltage will be developed in lead 42. Sampling is performed by connecting lead 74 of Figure 5 to the grid 60, thereby turning on electron beam during sampling intervals. A frequency doubler 76 is necessary where a sampler and multiplexer of the type shown in Figure 5C is used.

The details of a suitable type of multiplexer and sampler indicated generally by the numeral 34 in Figure 5 are shown in Figure 5C in which, for example, a 4 megacycle sampling control signal that is supplied by the frequency changer 78 is applied to the primary 80 of a transformer 82. The secondary 84 is connected in push-pull to the grids 86 and 88 of the amplification stages 90 and 92, respectively. Blue signals received from one of the means 32 of Figure 5 are applied to the grid 94 of a tube 90 which serves as an amplifier and the red signals provided by the other means 32 are supplied to the grid 96 of the amplifier tube 92. The plates of the tubes are connected through a common load resistor 98 to a source of B+ potential and, inasmuch as the 4 megacycle voltage alternately keys the tubes 90 and 92, the voltage developed across the resistor 98 will alternately represent the blue video signals and red video signals which are applied to the lead 36 shown in Figure 5.

Although the frequency of the sampling control signal applied to the primary 80 is shown in this particular example to be derived from the beat between the sound and video carriers, it is to be realized that this keying voltage can be derived from other sources such as sync or blanking pulses without the transmission of a special signal to synchronize the sampling at the transmitter and receiver. The color camera 20 and sync inserter 48 receive blanking and deflection voltages from a sync generator 100. Accordingly, the carrier supplied to the modulator 52 from the oscillator 54 is modulated with a wave form similar to 16 in Figure 3 which, as explained above, carries all the color information in a single scanned line as well as the synchronizing signals.

The audio portion of the program is transmitted by an audio transmitter constructed according to the present-day standards, designated by the numeral 102 in Figure 5, and comprises an audio amplifier, a reactance controlled oscillator, a frequency multiplier, a buffer, and a final amplifier which may be of any usual design.

It is apparent from the foregoing that some means must be provided for sampling the transmitted and received waves at the same intervals, for otherwise the information would be erroneous. An effective and relatively simple way of performing this function without transmission of a separate timing signal is provided by the detection of the beat frequency between the audio and video carriers. Therefore, a local receiver 104 may be provided having a detector 106 and a sharp filter 108 so arranged as to supply a beat frequency between the video and audio carriers to an amplifier 110. Depending upon the shape of the bandpass characteristic of the video transmitter, it may be necessary to alter this beat frequency and therefore a frequency changer, or controller 78, is provided; its output being supplied to the multiplexer 34 by the lead 112 and to the quantizer and sampler 38 by a lead 74 after being doubled in frequency doubler 76. In the illustrative example, the beat frequency in apparatus operating according to present carrier frequency allocation standards will be 4.5 megacycles. Device 78 is operative to change this to 4 megacycles. The device 78 is not a part of this invention and any suitable frequency changer can be used, but a suitable one will be described hereinafter. This also insures that the red and the blue signals will appear on line 36 at the same time that the sampled quantized green signals appear on 42. This same beat frequency can be detected at the distant receiver and used to control sampling in a manner to be explained below.

Figures 6, 6A, 6B:
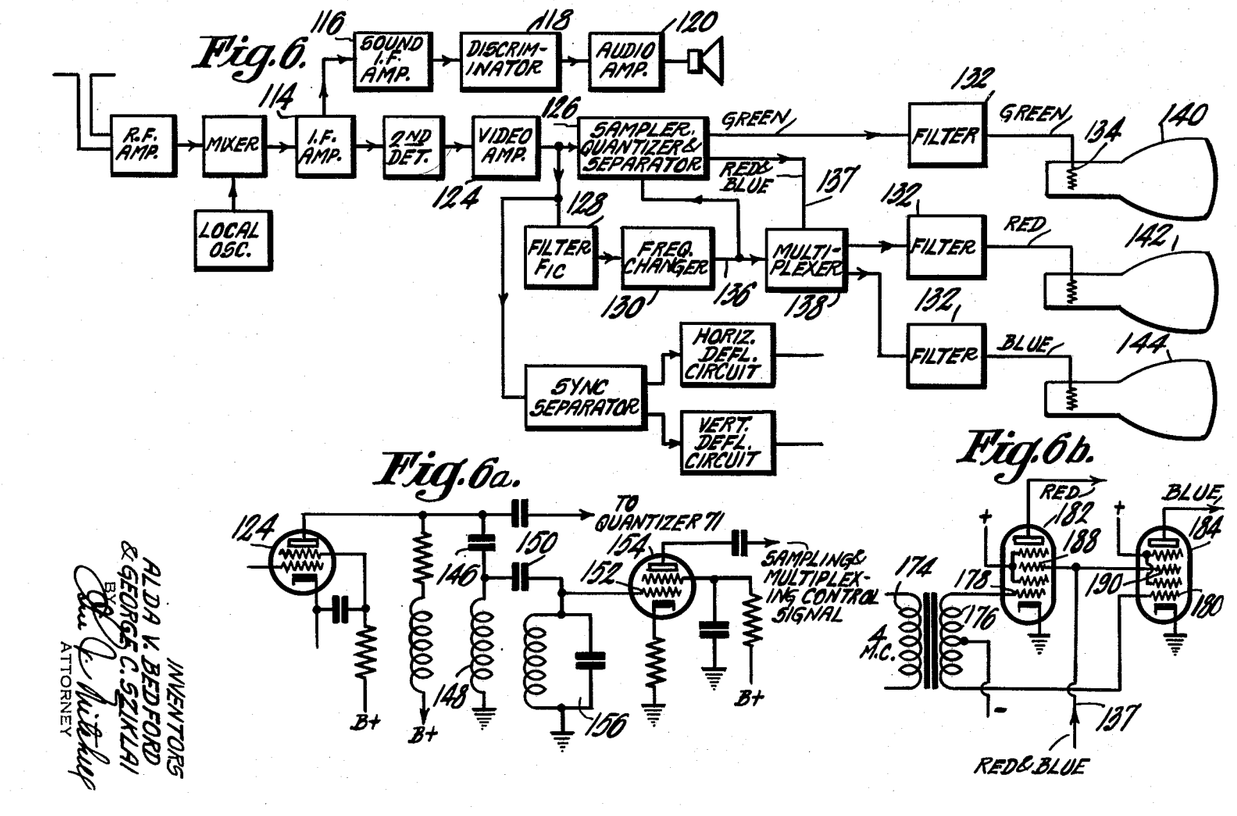
Figure 6 shows, schematically, a receiver constructed in accordance with the teachings of this invention.
Figure 6A shows the details of a circuit for controlling and sampling by the beat frequency between the audio and video carriers where accompanying sound is transmitted by a separate carrier.
Figure 6B shows a circuit arrangement which may be used for separating the red information from the blue information such as may be used in a receiver shown in Figure 6.

A receiver for separating out the red, green or blue information is illustrated in Figure 6. The sound information may be abstracted from a point in the I. F. amplifier 114 and passed through a conventional sound I. F. amplifier 116, discriminator 118 and audio amplifier 120 to a loud speaker. The stages of the I. F. amplifier 114 beyond the point where sound information is abstracted is still permitted to pass the sound I. F. carrier. In the receiver the output of the video amplifier 124 has video components in a frequency band up to 4 megacycles and a frequency modulated component in a band 4.5 megacycles plus or minus 25 kc. The video components are supplied to a means 126 for sampling and quantizing the detected modulation envelope, and separating the red and blue signals from the quantized signal. The frequency modulated components are selected by a filter 128 having a bandpass of 50 kc. and supplied to a frequency changer 130.

Figures 7, 8:
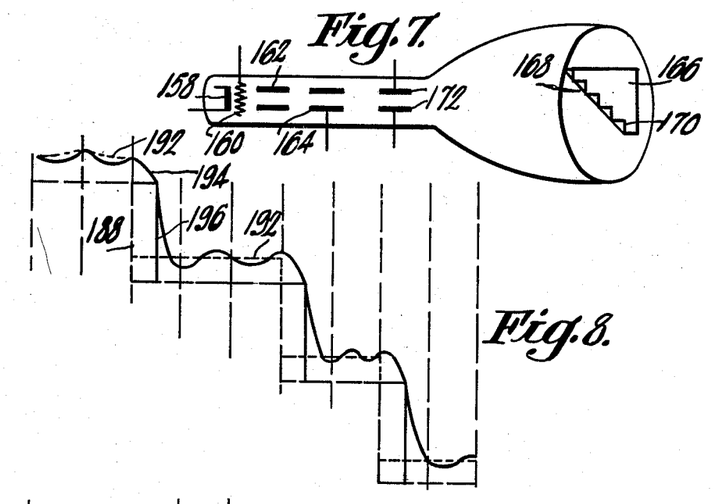
Figure 7 shows a tube that may be used in the invention for quantizing, sampling and separating.
Figure 8 includes a showing of a type of waveform that is received if sampling is not employed as well as the original transmitted wave.
Figure 9:
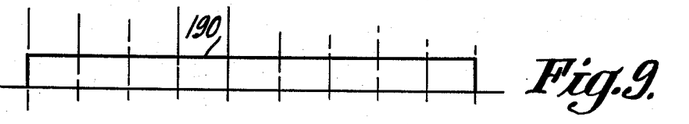
Figure 9 shows a wave that is to be added to a transmitted wave shown in Figure 8.

The means 126 for quantizing, sampling and separating the video components may be a special tube such as is shown in Figure 7 and will be discussed in greater detail below. The quantized sampled green signals at the output of means 126 may then be supplied to one of the filters 132 and thence to the control grid 134 of a cathode ray tube which may be used to reproduce the green image. The filter 132 has the same passband as the overall transmission system, and, therefore, it smooths out the samples to form a video wave similar to 2 in Figure 1.

In order to derive a proper sampling waveform means 130 also includes a conventional pulse forming network. The output is supplied via lead 136 to the quantizing, sampling and separating means 126 and to the multiplexer 138.

Accordingly, the green and red or blue pulses may be supplied to the grids of cathode ray tubes 140, 142 and 144, respectively, after being passed through low pass networks 132 which form continuously varying video waves that correspond to the waves 16, 12 and 14 of Figures 2A and 2B and 2.

In Figure 6A a circuit arrangement is shown for controlling the sampling of the received video signal. The filter 128 (Figure 6) as shown in Figure 6A comprises a condenser 146, an inductance 148 that are connected between the plate of the video amplifier 124 and ground. The values of the condenser and inductance are so chosen that the circuit is sharply resonant to the beat frequencies between the audio and video carriers. Under these conditions, a large voltage of beat frequency appears across the inductance 148 and is supplied by the condenser 150 to the grid 152 of an amplifier 154. The signal is accentuated by a grid circuit having a parallel resonant circuit 156 tuned to the beat frequency. The plate of tube 154 is coupled to a frequency changer 130 (Figure 6) that develops the sampling frequency. (Standard frequency modulation discriminator is also supplied with the same signal in order that audio intelligence may be detected.)

Although the sampling, quantizing and separating can be performed by circuits using common type of tubes, the number of tubes required discourages the use of such circuits in commercial television receivers. Fortunately, however, a tube similar to that shown in Figure 7 has been designed which performs all these functions and eliminates the necessity of having circuits of extremely wide passband. It is a special type of cathode ray tube similar to that of Figures 5A and 5B. It is provided with a cathode 158, control grid 160, accelerating anode 162, and focusing anode 164, that are so arranged as to project a horizontal flat beam, instead of the customary cylindrical beam. Two separate targets 166 and 168 are provided, target 166 having five discrete steps or gradations, as indicated by numeral 170, and the other target 168 being mounted behind the target 166 and extending only to the edges of the steps 170, as shown. If the video signal supplied by the amplifier 124 is applied to deflection plates 172, the horizontal beam is deflected vertically and, accordingly, inasmuch as the beam is broad enough to extend across the full width of the target 166, a stepped waveform of voltage would be developed. However, the sampling control signal from the sampling control generator 130 is applied to grid 169 whereby the beam is cut off except during the sampling intervals. Therefore, a pulse type wave like 6 in Figures 2 and 3 is produced at the target. This then represents the green signal and is applied via low pass filter 132 to the grid 134 of the cathode ray tube 140 that reproduces the partial green image.

In this manner, any voltage that is supplied to the deflection electrodes 172 which lies between quantizing levels does not produce any change in the output of the target 166. Fine variations in voltage lying between one quantizing step and the next are indicated, however, by the target 168, as its area struck by the flat beam gradually changes as the beam proceeds from one level to the other of target 166. The signals thus detected are supplied to the multiplexer 138 by the lead 137 of Figure 6.

In order that the operation of the multiplexer indicated by numeral 138 in Figure 6 may be understood, a detailed schematic diagram is shown in Figure 6B. The same frequency that was applied to the primary 80 of Figure 5C at the transmitter is derived by the filter 128 and the frequency changer 130 of Figure 6 and applied to the primary 174 of Figure 6B. The secondary 176 has one end attached to a grid 178 and the other end attached to the grid 180 of the amplifying stages 182 and 184, respectively. The red and blue signals derived through the lead 137 shown in Figure 6 and in Figure 6B are applied to the grids 188 and 190. In this way, the amplifying stages 182 and 184 are alternately conducting so that the red video signals appear in the plate circuit of tube 182 and the blue video signals appear in the plate circuit of tube 184.

The effect of sampling and keying will now be discussed in some detail with particular attention to the significance of the keying frequency. Reference is made to Figures 8 through 11 in which the dotted line or curve 188 represents the quantized green signal before it is presented to the adder 40 and the rectangular shaped curve 190 of Figure 9 may represent, for the sake of simplicity, a constant amount of red and blue information which appears as the dotted curve 192 after it has been superimposed upon the quantized green information indicated by the numeral 188.

Figures 10, 11:
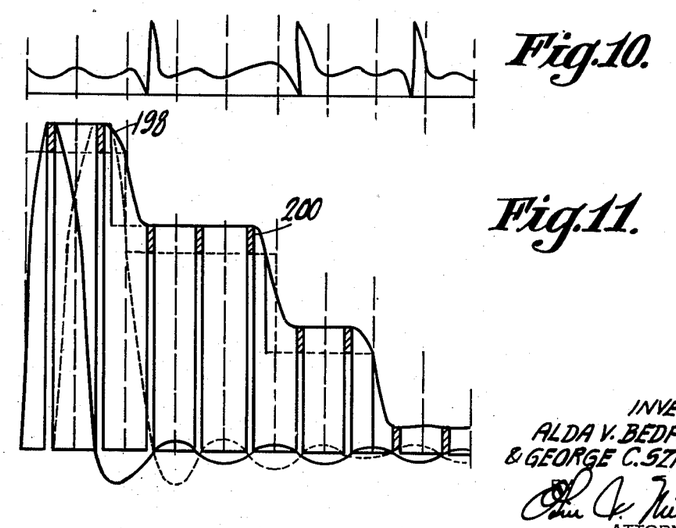
Figure 10 shows a type of wave reproduced from the wave shown in Figure 9.
Figure 11 illustrates the transient response due to the sampling.

The vertical lines in all of these figures of the drawing indicate a scanning element and it may be defined as the shortest time in which the reproduced video modulation can go from black to the most intense white, and, accordingly, it is measured as being equal to half the highest frequency of the passband of the system, or ½ $f_0$. In other words, no signal transmitted can change from one extreme to the other faster than the highest frequency passed by the system. Therefore, a waveform such as indicated by the solid line 194 will appear as the actual modulation of the video carrier when subjected to a bandwidth restriction indicated by the vertical lines. Whereas it approximates the stepped modulation of the quantized green wave indicated by the dotted curve 188, the information corresponding to the curve 190 that was superimposed at the mixer is badly distorted. This can be illustrated by operating on the curve 194 in the same manner as a receiver, i. e., quantizing the curve 194 so as to form a stepped wave form 196 and subtracting the difference between the two which should, if the receiver were to operate satisfactorily, be the same waveform as 190. However, such subtraction produces a waveform such as shown in Figure 10 that is so badly distorted as to be useless. The basic reason for this distortion is found in the fact that the shape of the wave 194 is determined largely by the transient response of the transmitter and not by the value of the second information that is superimposed on the quantized green wave.

A study of Figure 11 shows how such distortion is avoided if sampling is employed and the transmission system has a bandwidth properly related to the sampling frequency. If the wave 190 is first superimposed on the quantized wave 188 and the resultant wave 192 is sampled as shown, the modulation envelope 198 thus formed will pass through the peaks of these pulses if the transients produced by the pulses do not interfere. Therefore, it can be said that at sampling intervals the information represented by the modulation is exactly correct even though it may be incorrect between the sampling pulses. At the receiver then, it is only necessary to sample the detected modulation 198 at the same time it was sampled at the transmitter, for during these intervals the amplitude is unaffected by the distortions at the transmitter and the cross-hatched portions of the sampling pulses indicated by the numeral 200 can be separated and applied to a separate channel so as to form a wave that is the same shape as the wave 190. Thus, the secondary intelligence that was originally superimposed on the quantized wave is recovered without distortion.

Elimination of the effect of transients during sampling intervals is accomplished by passing the samples through a transmission system having a bandwidth that is restricted to such a degree that the transients pass through zero during sampling intervals and therefore do not add or subtract to other samples.

The matters discussed in the immediately foregoing may be considered from a different point of view with the same result. Sampling or keying is considered further and in greater detail in some respects in the following. The object of quantizing in this invention is to save bandwidth by adding a second channel of information at reduced amplitude between quanta levels of the quantized wave. However, it would defeat the purpose of saving bandwidth if it were necessary to use enough bandwidth to transmit the stepped wave 4 of Figure 1 retaining its steep rises and the flat regions. If wave 4 were passed through a transmission channel having a continuous passband up to a cut off frequency $f_0$ having a period of two time units on the scale in Figure 1, as shown, the output would be a smooth wave 202 (Figure 1). Inspection of wave 202 shows no consistent useful connection with the quanta levels so that it could not be determined what, if any, second signal had been added to the quantized wave 4 before the restriction of the bandwidth. The quanta levels could be observed for the one or two extended flat parts of wave 4, but this occurs only when the signal variations happen to be so slow that the full band up to $f_0$ is not being utilized.

Figure 4:
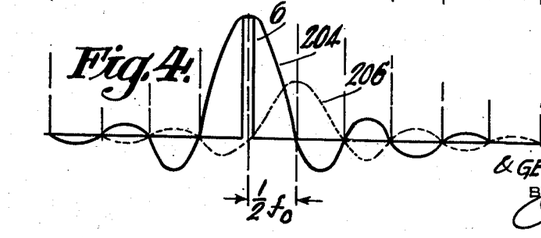
Figure 4 illustrates the transients formed by a series of pulses.

By sampling wave 4 at the uniform time intervals of half a period of the cut-off frequency $f_0$, a solution has been found. Figure 2 shows the pulses 6, each having amplitude equal to the quantized signal 4 and a relatively narrow width compared with its period. When such a series of pulses has its components above $f_0$ cut off without distortion in the passband, it becomes a wave of reduced amplitude which when properly amplified is like wave 18 and passes through the peak of each pulse, as shown. The reason for this is found in the fact that a single narrow pulse 6, as shown in Figure 4, has a transient response 204 which is a maximum during the pulse and has zero amplitude at each uniform interval of $\tfrac{1}{2}f_0$ second both before and after the pulse. Obviously, a pulse cannot cause a response before it occurs so that it must be understood that the pulse 6 of Figure 4 actually occurred well before the time shown and that the difference between that time and the time shown is the uniform delay of the low-pass filter. This uniform delay will be ignored in future considerations since its effect can be effectively neutralized by the use of suitable matching delay networks in other associated circuits. The form of wave 204 is expressed by the well known equation:

$$y = \sin X / X$$

which becomes:

$$\text{amplitude} = a = \sin 4\pi f_0 / 4\pi f_0$$

It is evident that since the transient response 204 or 206 from each pulse is zero at each interval $\tfrac{1}{2} f_0$, any number of pulses of any amplitude can be added at these particular intervals without affecting the overall response at these intervals except at the time of the pulse itself. Thus, by sampling the wave 18 at precisely the same time intervals as the pulses which formed it, a set of pulses can be recovered which are proportional to the original pulses. While the foregoing discussions of sampling and keying are offered in explanation of the operation of a feature of this invention, it will be understood that the results attained may be otherwise explained without in any way affecting the result.

Since the passband of transmission systems operating on present-day standards is about 4 megacycles, the sampling should occur at a rate of about 8 megacycles. An arrangement for deriving this sampling frequency that is still dependent upon the beat frequency between the video and audio carriers may comprise a locked-in oscillator or multivibrator for dividing the 4½ megacycles beat signal by 9 and a means for multiplying the resultant frequency by 8 so as to give 4 megacycles. In a similar manner, a pulse wave of 6¾ megacycles or any other fraction of the 9 megacycles may be created and used as a sampling pulse. Of course, the 4 megacycle frequency derived at the output of the divider is also available and may be of use where a sampler and multiplexer such as shown in Figure 5C is employed.

The location in the system where the bandwidth is restricted makes little difference as long as it lies between the adder 40 at the transmitter and the separating or subtracting means, for example, the device 126 (Figure 6), at the receiver because after the signals are separated no crosstalk is possible and it is merely necessary to integrate the pulses to form a continuously varying video wave similar to that picked up at the camera. It is preferable to locate circuits for providing the desired bandwidth restriction at the transmitter, even though they could be located at each receiver as far as the operation is concerned. The R. F. and I. F. sections of the receiver need only have passbands which are wider than that at the transmitter.

In a transmission system such as has been described, the full bandwidth will be available to the quantized signal, and, in the arrangement shown, this signal corresponds to green. Because the red and blue colors are multiplexed, their effective bandwidths will be less than the total bandwidth, the exact amount depending upon the number of blue pulses that are sent compared with the number of red pulses. Because the human eye has very much less resolution in blue and slightly less resolution in red than it does in green, transmission of the red or blue at reduced bandwidth does not appreciably harm the quality of the televised colored image. The principal reason for transmitting green with full bandwidth is that the eye is most sensitive to green colors, having a response curve similar to that exhibited by Verichrome films. Therefore, if the black and white receivers now in use receive the signal as sent out by the transmitter of this invention, it will produce satisfactory black and white images because not only is the green transmitted at full bandwidth, but the reds and blues are added at reduced amplitude and with half bandwidth.

Figures 12, 12A, 13:
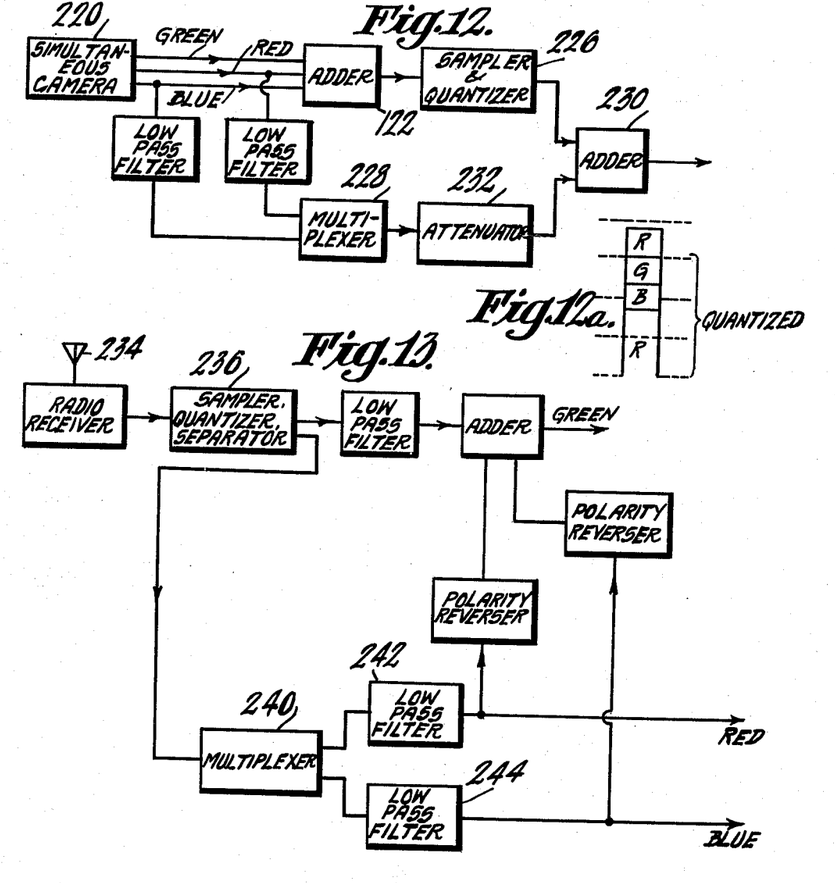
Figure 12 shows a transmitter in which a panchromatic signal is quantized.
Figure 12A shows a quantized sample of video information appearing in the transmitter of Figure 12 that is substantially panchromatic.
Figure 13 shows a receiver adapted to receive and analyze the signal sent out by the transmitter shown in Figure 12.

Apparatus embodying the invention in modified form for accomplishing this is shown in Figures 12 and 13 in which the red, green and blue video signals are obtained from a color camera 220 as before, but all of them are added directly in the adder 222 to form a panchromatic signal. The resultant signal is made equal to one-third of its value and is then sampled and quantized by the device 226 in the same way that the green signal was quantized and sampled in the equipment discussed above. The red and the blue signals are also supplied to the multiplexer 228 and are added to the quantized panchromatic signal at the adder 230 after being reduced so that their maximum amplitude lies within one quanta level by a means which may be attenuator 232. The pulse put out by the adder 230 as shown in Figure 12A will have an amplitude representing the quantized sums of various portions of red, blue and green that are one-third their true values and another portion of amplitude which is unquantized and which is red or blue, depending upon the output of the multiplexer for that particular pulse and is attenuated so as to fit between two adjacent quantized levels. In other words, in the pulse shown there are really two sections devoted to red, one of which is reduced to one-third and the other of which is reduced sufficiently to place it within a quantized level. If the number of quantized levels chosen is great enough that individual levels are not recognizable by the eye, then the attenuated red or blue signals supplied by the multiplexer will not appreciably affect the image reproduced by the black and white television receiver, even though the pulse cannot be said to be precisely panchromatic. These pulses are fed to the modulator of the transmitter and sent out in the same fashion as described above.

The composite wave that is received on the antenna 234 of the receiver shown in Figure 13 is detected and supplied to a sampling, quantizing and separating means 236 that is the same as that indicated by numeral 126 in Figure 6. The red and blue pulses that were attenuated so as to fit between two quantized levels are extracted in the same manner as they were before and supplied to a multiplexer which alternately supplies them to the grids of separate cathode ray tubes which form the partial images. The quantized signal, however, instead of being green, is a substantially panchromatic signal having red, blue and green contents of the picture, all reduced by a factor of one-third. If this signal is amplified by a factor 3, the green can be separated by subtracting from this quantized panchromatic pulse, the unquantized red and blue components. This is accomplished by amplifying the amplitude of the red and blue pulses as they appear at the output of the multiplexer 240 by an amount that will bring them up to their original relative value in the scene, this amount, of course, depending in part upon the number of quantized levels. The red and the blue pulse-type signals obtained by the multiplexer at the receiver are made into smooth waves by the low-pass filters 242 and 244. The outputs of the filters, after having their polarities reversed in the polarity reversers, are added to the panchromatic signal. Thus, in effect, the red and the blue signal has been subtracted to produce the green signal.

That arrangements could be provided for sending a truly panchromatic signal is apparent when it is realized that the quantized signal can represent a plurality of sets of information, but it is believed that the figures described are adequate to illustrate how substantially panchromatic signals could be quantized and sampled in accordance with the teachings of this invention.

A discussion of various types of equipment that differ in the details of the circuit arrangement but function in essentially the same way will now be given.

Figures 14, 14A, 14B:
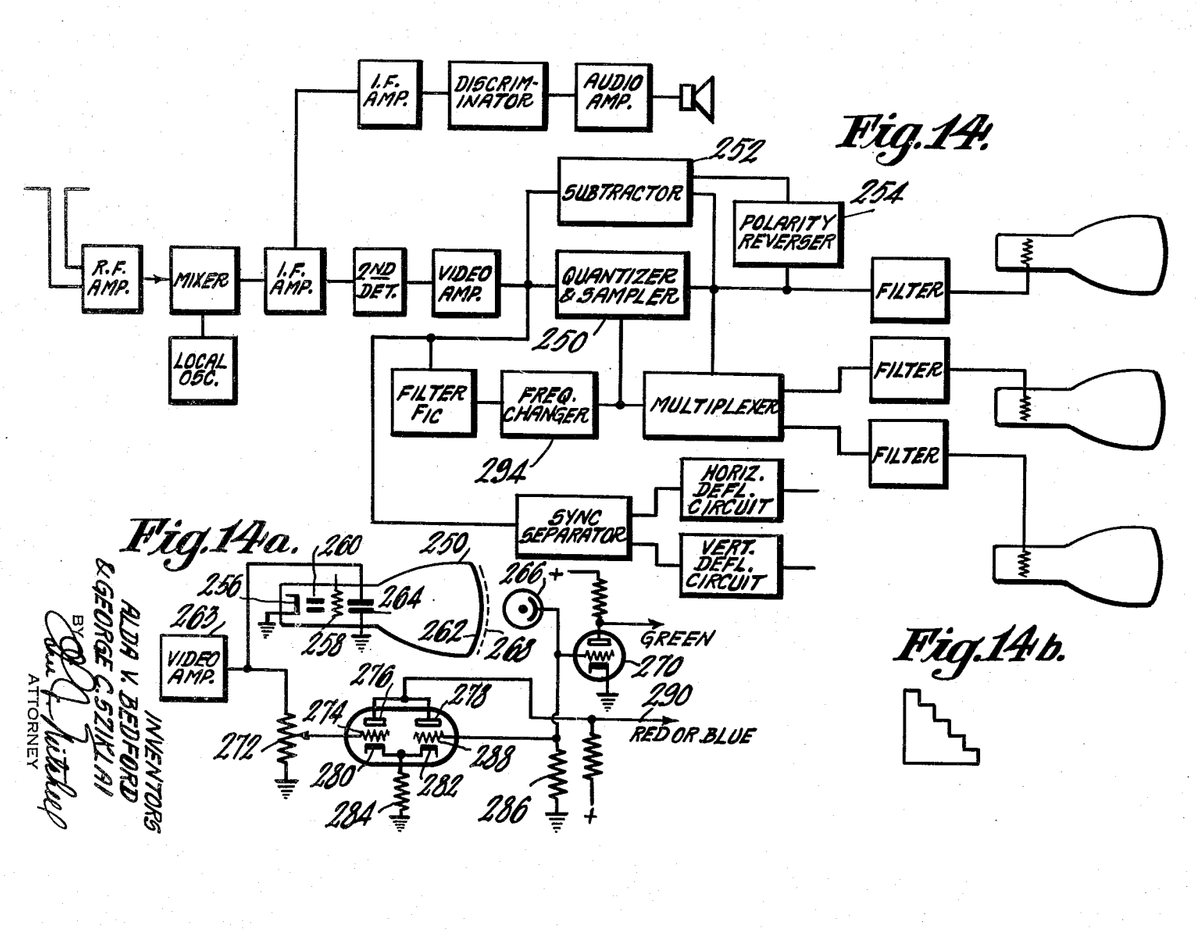
Figure 14 shows another form of receiver constructed in accordance with this invention.
Figure 14A shows the details of a subtractor and of a quantizer and sampler.
Figure 14B illustrates the shape of a mask inserted between the cathode ray tube and a photoelectric cell shown in Figure 14A.

The receiver shown in Fig. 14 is the same as the receiver shown in Figure 6, with the exception that the received video wave is quantized and sampled by one apparatus indicated by numeral 250 and the multiplexed red and blue signal is separated by a subtractor 252. The subtractor is really an adder to which the quantized signals are applied after passing through a polarity reversing means 254. Figure 14A shows details of a circuit arrangement performing these functions in which the quantizer and sampler comprise a cathode ray tube having a cathode 256, control grid 258, a means 260 for focusing the stream of electrons into a flat horizontal ribbon and a luminescent screen 262. The output of the video amplifier 263 is applied to vertical deflection plates 264 so that the horizontal beam is raised and lowered, depending upon the amplitude of the video signal. The face of the cathode ray tube is of the ordinary type, but between it and a photoelectric cell 266 there is placed a mask 268 having a stepped shape, as indicated in Figure 14B. Therefore, the amount of light that reaches the photo cell 266 depends upon the vertical position of the beam with respect to the mask 268, and the voltage applied to the grid of amplifier 270 is quantized and, as indicated above, it represents the green signal illustrated by waveform 6 in Figures 2 and 3. The output of the video amplifier 263 is also connected by a potentiometer 272 to the grid 274 of an amplifier having its plate 276 connected to the plate 278 of a second amplifier and its cathode 280 connected to the cathode 282 of the other amplifier, a common cathode resistor 284 being connected between the cathodes and a source of fixed potential. The quantized voltage developed across resistor 286 by the photoelectric cell 266 is applied to the grid 288 of the second amplifier in opposite polarity to the video signals applied to grid 274 and, accordingly, the red and blue signals are supplied by lead 290 to the multiplexer 292 and are illustrated by the combined pulses 8' and 10' in Figure 3. Sampling is achieved by connecting the grid 258 to the output of the frequency changer and pulse former 294 that is similar to 130 of Figure 6. Therefore, the cathode ray tube, mask and photo tube may be called a quantizer and a sampler, and the parallel amplifiers, which would normally be considered an adder, may be termed a subtractor, since the polarity of one of its input signals has a reversed polarity. A cathode ray tube of similar construction could be used for quantizing and sampling the green signal at the transmitter.

Figure 15:
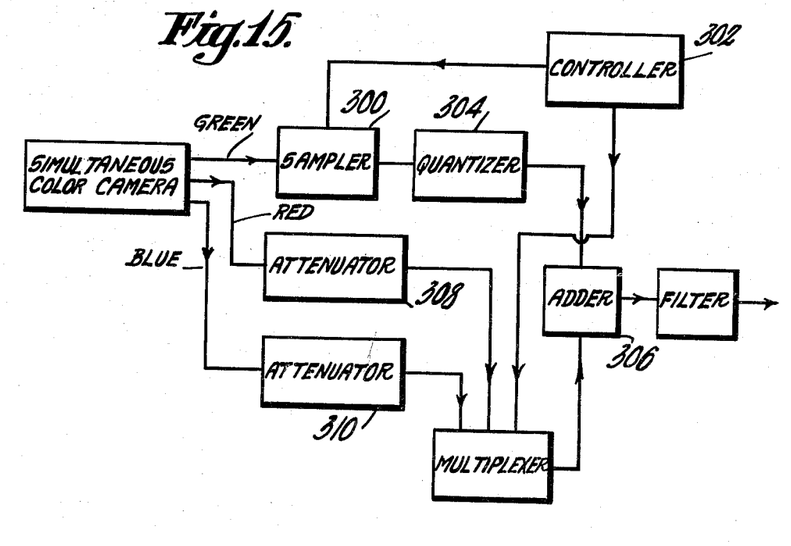
Figure 15 shows a type of transmitter in which the information is sampled before it is quantized.
Figure 16:
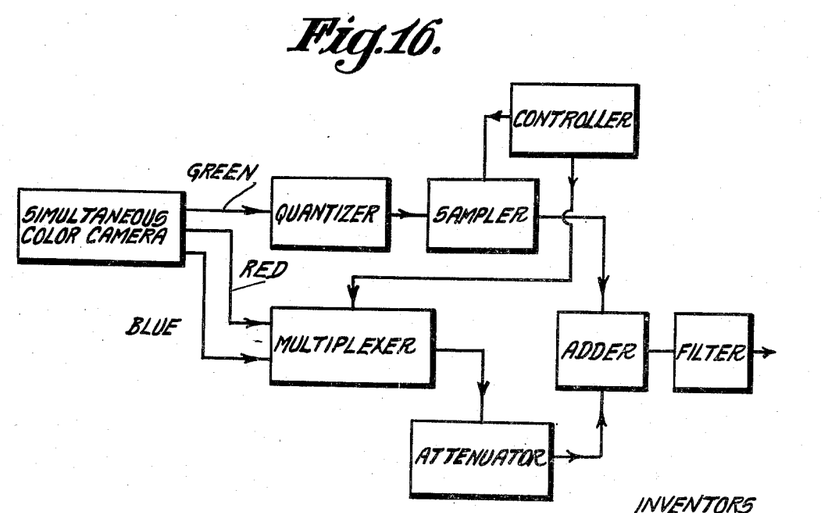
Figure 16 shows a transmitter in which the video signal is quantized before it is sampled.

Other variations in design of transmitters that perform in accordance with the concept of this invention are illustrated in the Figures 15 and 16. In Figure 15 the green signal is supplied directly to a sampler 300 which may be in the form of a coincidence tube or keying tube that is controlled by controller 302. The controller may be an independent oscillator or may represent the means for deriving the beat signal between the audio and video carriers as illustrated in Figure 5. The output of the sampler is then applied to a quantizer 304 and the output of the quantizer is applied to the adder 306. The red and blue video signals are supplied to separate attenuators 308 and 310 that reduce the amplitude of the video signal so that they lie within a quantized level and these reduced signals are applied to the multiplexer which multiplexes at a rate determined by the controller 202 in order that the red or blue signals may be sampled at the same time the green signal is sampled.

The arrangement shown in Figure 16 is different from that shown in Figure 15 in two respects. In the first place, the green video signal is quantized before it is sampled. In the second place, the red and blue signals are multiplexed before they are compressed so as to lie in a quantized level. However, as long as the sampling rate is the same at both transmitter and receiver, it makes no difference which combination of transmitter and receiver is used.

Any known means may be employed for making the second digit signals corresponding to red and blue lie within a level of the first digit signals corresponding to green. It may be that they are amplified less or it may be that they are simply attenuated. In discussing the color television system that is the subject of this invention, the explanation has been based on a system where the green signal is quantized and the red and blue signals are multiplexed, but it is obvious that it makes no difference which signal is quantized or whether two colors are used or three, or whether the colors are red, green or blue.

Furthermore, the signals representing green, red and blue in the discussion given above may represent any desired information or be coded in any desirable manner without extending beyond the scope of this invention.

Having described our invention, we claim:

1. A transmitter comprising means for deriving a plurality of voltage waves, each wave having its amplitude varied in accordance with a respective intelligence, means for quantizing one of said voltage waves into discreet levels, means for causing amplitude variations of other voltage waves to lie between quantized levels, means for adding said quantized wave and at least one of said other waves only during predetermined intervals, an electronic low pass filter coupled to the output of certain adding means, the upper frequency limit of said filter being in cycles per second not greater than half the number of said intervals that occur within a second.

2. A receiver comprising means for receiving a signal, means for sampling said received signal, means for quantizing said sample signal thereby to develop a voltage wave that passes from one discreet level to another as the received signal goes through proportional levels, means for detecting the difference voltage wave between said quantized wave and sampled signal wave to produce a wave indicative of red and blue signal intelligence and means for utilizing said difference voltage wave and quantized signal thereby to produce an output signal indicative of the various color components of the original transmitted signal.

3. A transmitter comprising in combination a quantizer, an input circuit wherein means are provided for utilizing the relationship between amplitude ranges of signals supplied to said input circuit and the quota levels supplied by said quantizer, said amplitude range lies within at least one of the signal levels supplied by said quantizer, an adder adapted to receive the output of said quantizer and the signals applied to said input circuit and sampler connected to the output of said adder.

4. A transmitter comprising a source of waves having the amplitude thereof varied in accordance with respective intelligences, means for restricting one or another of said waves to one of a plurality of values of said amplitude, means for restricting the amplitude of the other signals to lie within adjacent values of said amplitudes, means for adding at least some of said restricted waves to the output of said latter means during predetermined intervals, means for restricting the bandwidth of the output of said means for adding said waves, and means for determining the frequency of said intervals.

5. A transmitter comprising means for deriving a voltage wave corresponding to a first intelligence, means for sampling and quantizing said voltage wave, means for deriving a voltage wave corresponding to a second intelligence, means for deriving a voltage wave corresponding to a third intelligence, means for causing said latter two voltage waves to lie within a contemporaneous quantized level, and means for successively superimposing said two voltage waves onto said quantized and sampled wave during the sampling intervals.

6. A receiver comprising means for receiving and detecting a transmitted wave, means for simultaneously quantizing and sampling said wave, means for comparing said received wave with the output of said latter means, a plurality of output filters each having a bandpass characteristic the highest frequency of which is approximately half the sampling frequency, means for applying the quantized and sampled wave to one of said filters, and means for applying at successive sampling intervals the output of said means for comparing to another of said filters.

7. A system for transmitting two sets of information comprising a means for generating a first voltage wave having a characteristic thereof varied in accordance with a first intelligence, means for developing a second voltage wave representative of the time the characteristic of said first voltage wave is within separate predetermined regions, means for developing a third voltage wave having a similar characteristic thereof varied in accordance with a second intelligence, means for maintaining the characteristic of said third voltage wave within the predetermined region said first voltage wave is in, means for sampling the second and third voltage waves at the same uniformly-spaced intervals, means for producing a superimposed voltage wave having a characteristic thereof varied in accordance with the summation of intelligence represented by variation in the characteristic of said second and third voltage waves, means connected so as to transmit said superimposed voltage wave, said latter means having a bandpass characteristic such that the transients produced by one of said sampling intervals pass through zero at other sampling intervals.

8. An apparatus for receiving and identifying a plurality of sets of information comprising means for receiving and detecting a signal, means for producing a first voltage wave having a characteristic thereof that changes from one discrete value to another as a characteristic of the received signal varies through corresponding proportionate levels, means for sampling said first voltage wave at uniform intervals, means for separating the difference between said first voltage wave and the received signal, means for applying this difference to a plurality of output circuits during sampling intervals, means for passing each of said sampled signals through a filter network having a bandpass characteristic such that the transients produced by sampling pass through zero at sampling intervals.

9. A transmitter for developing the voltage wave conveying to a plurality of sets of intelligence comprising a first means for developing a voltage corresponding to a first intelligence, a second means for developing a voltage corresponding to another intelligence, means for keying the output of said first means and the output of said second means at uniform intervals, means for breaking the keyed output of said first means up into a series of discrete levels, means for reducing the keyed output of the second means so that its range lies within said discrete levels, means for effectively superimposing said reduced output onto the wave having discrete levels, and means for restricting the frequency bandwidth of the superimposed wave thus formed so that the transients produced by the inspection at uniform intervals are of a frequency that is half the rate of inspection thus forming a composite video signal.

10. A transmitter for sending a plurality of sets of information at reduced bandwidth comprising a means for developing a voltage wave corresponding to a first intelligence, a means for inspecting said voltage wave at uniform intervals, means for developing a second voltage wave from said inspected wave having a characteristic thereof that changes as the first voltage wave passes through discrete levels within a given range, a means for developing a voltage wave corresponding to a second intelligence, means for developing a voltage corresponding to a third intelligence, means for inspecting said latter two voltage waves at successive intervals, means for limiting the variations of a characteristic of said latter inspected voltage waves so that it lies between said discrete levels, means for accumulatively adding the characteristics of said first voltage wave of said latter two voltage waves, and means for restricting the bandwidth of the superimposed wave thus formed such that the transient response produced by the inspection intervals is half the frequency of the rate of inspection.

11. A receiver for receiving and detecting separate intelligences in a composite wave comprising means for developing a first voltage wave having a characteristic thereof varied in accordance with a received composite wave, means for keying a composite wave at uniform intervals, means for developing a second voltage wave from the keyed composite wave that changes from one discrete value of a given characteristic to another as the characteristic of the keyed composite wave passes through proportionate values, means for comparing the second voltage wave with the keyed composite wave in order to separate those parts of the keyed composite wave that lie between one value of its characteristic and adjacent value, first, second and third filters having bandwidth characteristics that are approximately one-half the keying frequency, connections between the device for developing said second wave and one of said filters, and means for applying the output of the comparing means alternately to said second and third filters at the keying frequency.

12. A color television transmitter for transmitting colored images within the same bandwidth required for the televising of black and white images comprising a simultaneous color camera, a sync generator coupled to said camera so as to provide blanking and deflection voltages thereto, a multiplexer connected to said camera so as to receive video signals corresponding to the partial images of red and blue, a single output connected to the multiplexer, a combination quantizer and sampler adapted to receive green signals corresponding to the green partial image from the camera, a mixer for adding the quantized green signals with the multiplexed red and blue signals so as to give a combined video signal, a filter, a sync inserter connected to the sync generator, a source of a first carrier frequency, a modulator, means for applying said carrier frequency to said modulator, a series-connection between said mixer, said filter, said sync inserter and the modulator, means for transmitting the output of a modulator, a source of a second carrier frequency, means for detecting the beat frequency between the first carrier and the second carrier, means for keying the multiplexer and the quantizer at a frequency related to said beat frequency, said filter having a bandpass characteristic that is approximately one-half said keying frequency.

13. A transmitter for transmitting a plurality of intelligences in a single composite wave comprising a means for generating a first carrier frequency, means for generating a second carrier frequency, means for detecting the beat frequency between said carriers, a means for deriving a voltage wave having a characteristic thereof varied in accordance with a first intelligence, means for deriving a voltage wave having a characteristic thereof varied in accordance with a second intelligence, and means for deriving a voltage wave having a characteristic thereof varied in accordance with a third intelligence, means adapted to receive a voltage wave corresponding to said first intelligence, said latter means being capable of quantizing and sampling said wave, and means for sampling and quantizing being operated in conjunction with the beat frequency detector, means for compressing the voltage waves corresponding to the second and third intelligence within quantized levels of the voltage wave corresponding to the first intelligence, means operated in conjunction with the beat frequency detector for alternately superimposing in an accumulative sense the compressed waves corresponding to the second and third intelligences respectively onto the output voltage wave of said quantizing means thus forming a superimposed wave, means for applying to said filter said superimposed wave having a frequency bandpass characteristic that is approximately half as wide as the keying frequency, a modulator being connected to said second carrier generator, and connections between said filter and said modulator such that the carrier is modulated with a composite wave.

14. A transmitting and receiving system for creating and receiving a composite wave capable of conveying a plurality of sets of intelligence at a reduced bandwidth comprising a source of a voltage wave having a characteristic thereof varied in accordance with a first intelligence, a means for keying the output of said source at uniform intervals, a means for quantizing the keyed output, a second source for developing a voltage wave having a characteristic thereof varied in accordance with a second intelligence, means for compressing the characteristic thereof within one of the quantized levels, a third source for producing a voltage wave having a characteristic thereof varied in accordance with a third intelligence, a means for compressing the output of said third source so that it lies within a quantized level, a mixer connected so as to receive the quantized signal, a means for alternately applying the compressed signals representing the second and third intelligences to said mixer, said mixer being capable of accumulatively adding the characteristics of said waves that are varied in accordance with the various intelligences being transmitted, means for transmitting the superimposed wave thus formed, said means having a bandwidth that is approximately half the frequency of said keyed intervals so that a composite wave is formed, means for receiving and detecting said composite wave, means for keying said received wave at the same intervals with respect to it that it was keyed at the transmitter, means for quantizing the keyed wave, means for separating the parts of the wave lying between one quantized level and another, three output circuits, said output circuits having a bandwidth restriction that is the same as said transmitting means, one of said output circuits being connected to said means for quantizing a switching device for applying the output of said separating means alternately to said other two circuits.

15. A receiver comprising in combination an input terminal and first and second output terminals, quantizing and sampling means connected between said input terminal and said first output terminal, and subtracting means connected between said input terminal and said second output terminal adapted to supply voltages representative of the difference between the signal applied to said input terminal and the output of said quantizing means.

16. A receiver comprising in combination means for detecting a signal, a sampler coupled to the output of said signal detecting means, a quantizer connected to the output of said sampler, and means for deriving a signal that is representative of the amplitude difference between the signals supplied by said detector and the output of said quantizer.

17. A receiver as described in claim 16 wherein said last means is a subtractor connected between the input and output of said quantizer.

18. A receiver comprising the combination of a detector adapted to derive a signal, a quantizer coupled to the output of said detector so as to receive said signal, a first sampler coupled to the output of said quantizer, means for deriving a voltage wave representative of the difference in amplitude between said signal and the output of said quantizer, and a second sampler coupled to the output of said voltage deriving means.

19. A receiver as described in claim 18 wherein said voltage deriving means is comprised of a subtractor connected between the output and input of said quantizer.

20. Apparatus for forming a composite signal at an output terminal that is coded so as to represent a plurality of distinct signals, the coding being performed in such manner that the composite signal occupies less bandwidth than the sum of the frequency ranges of the distinct signals comprising in combination a source of a first signal, and a source of a second signal, an output terminal, a first channel coupled between the source of said first signal and said output terminal, said first channel including a quantizer having a plurality of quanta levels, a second channel coupled between said source of the second signal and said output terminal, means for adjusting the relative gains of said channels in such manner that the maximum amplitude of the second signal is less than the signal amplitude between adjacent quanta levels, and sampling means coupled to said channels and adapted to permit energy to flow from said sources to said output terminal only during predetermined uniformly spaced intervals.

21. Apparatus for forming a composite signal at an output terminal that is coded so as to represent a plurality of distinct signals, the coding being performed in such manner that the composite signal occupies less bandwidth than the sum of the frequency ranges of the distinct signals comprising in combination a source of a first signal, and a source of a second signal, an output terminal, a first channel coupled between the source of said first signal and said output terminal, said first channel including means for producing a signal having a different amplitude for each of a plurality of contiguous ranges of said first signal, a second channel coupled between said source of the second signal and said output terminal, means for adjusting the relative gains of said channels in such manner that the maximum amplitude of the second signal is less than the signal amplitude between adjacent quanta levels, and sampling means coupled to said channels and adapted to permit energy to flow from said sources to said output terminal only during predetermined uniformly spaced intervals.

22. Apparatus as described in claim 20 wherein there is also provided a low pass filter, means for connecting the input of said filter to said output terminal, the highest frequency passed by said filter not being greater in cycles per second than one half the number of times a second said sampling means permits energy to flow to said output terminal.

23. Apparatus for recovering separate and distinct first and second signals from a composite signal that is derived from said first and second signals by quantizing the first signal so as to produce a voltage wave that can only have one of a plurality of substantially separate levels at any one time, combining said second signal with the quantized first signal in such manner that the maximum amplitude of the second signal cannot exceed the amplitude between the different levels provided by said quantizer and periodically sampling and applying the combined signal to a low pass filter, comprising in combination a quantizer that can produce a voltage wave having the same proportionate levels as the quantizer to which the first signal was applied during the formation of the composite signal, means for subtracting the output of said quantizer from said composite wave, a first output terminal coupled to the output of said quantizer and a second output terminal coupled to the output of said quantizing means, and sampling means coupled to said quantizer and said subtracting means in such manner as to permit energy to flow to said output terminals during intervals corresponding to those during which the combined signal was applied to the low pass filter in the apparatus that derived the composite wave, and means coupled to one of said output terminals.

24. Apparatus for decoding a composite wave so as to derive two distinct signals from a composite signal comprising an input terminal to which said composite signal may be applied, a first output terminal and a second output terminal, means for producing a voltage wave having a different discrete value for each of the different contiguous ranges of voltage applied to it, means for coupling said latter means between said input terminal and said first output terminal, subtracting means coupled between said first output terminal and said input terminal, means for coupling the output of said subtracting means to said second output terminal, and sampling means coupled between said input terminals and said output terminal adapted to permit energy to flow to said output terminal during uniformly spaced sampling intervals.

25. Apparatus as described in claim 24 wherein a low pass filter having an upper limit of frequency that is equal in the number of cycles per second to one half the number of sampling intervals occurring per second is coupled to each of said output terminals.

ALDA V. BEDFORD.
GEORGE C. SZIKLAI.

References Cited in the file of this patent

UNITED STATES PATENTS

| Number | Name | Date |
|---|---|---|
| 2,272,638 | Hardy | Feb. 10, 1942 |
| 2,333,969 | Alexanderson | Nov. 9, 1943 |
| 2,335,180 | Goldsmith | Nov. 23, 1943 |
| 2,375,966 | Valensi | May 15, 1945 |
| 2,412,964 | Chatterjea | Dec. 24, 1946 |
| 2,419,568 | Labin | Apr. 29, 1947 |
| 2,444,950 | Nichols | July 13, 1948 |
| 2,461,515 | Bronwell | Feb. 15, 1949 |
| 2,492,926 | Valensi | Dec. 27, 1949 |
| 2,517,265 | Wald | Aug. 1, 1950 |
| 2,558,489 | Kalfaian | June 26, 1951 |
| 2,580,903 | Evans | Jan. 1, 1952 |
| 2,634,324 | Bedford | Apr. 7, 1953 |